(12) United States Patent
Jayasuriya et al.

(10) Patent No.: US 12,437,419 B2
(45) Date of Patent: Oct. 7, 2025

(54) TRACKING-BASED MOTION DEBLURRING VIA CODED EXPOSURE

(71) Applicants: Suren Jayasuriya, Tempe, AZ (US); Odrika Iqbal, Tempe, AZ (US); Andreas Spanias, Tempe, AZ (US)

(72) Inventors: Suren Jayasuriya, Tempe, AZ (US); Odrika Iqbal, Tempe, AZ (US); Andreas Spanias, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 18/516,679

(22) Filed: Nov. 21, 2023

(65) Prior Publication Data

US 2024/0153103 A1 May 9, 2024

Related U.S. Application Data

(62) Division of application No. 17/348,392, filed on Jun. 15, 2021, now Pat. No. 11,880,984.

(60) Provisional application No. 63/041,260, filed on Jun. 19, 2020, provisional application No. 63/039,224, filed on Jun. 15, 2020.

(51) Int. Cl.
*G06T 7/20* (2017.01)
*G06T 5/73* (2024.01)
*H04N 19/20* (2014.01)
*H04N 23/73* (2023.01)

(52) U.S. Cl.
CPC ............... *G06T 7/20* (2013.01); *G06T 5/73* (2024.01); *H04N 19/20* (2014.11); *H04N 23/73* (2023.01)

(58) Field of Classification Search
CPC . G06T 5/003; G06T 7/20; G06T 2207/20208; G06V 10/25; H04N 5/2353; H04N 5/23254; H04N 5/23267; H04N 5/238; H04N 5/23218
See application file for complete search history.

(56) References Cited

U.S. PATENT DOCUMENTS

2007/0258707 A1* 11/2007 Raskar ............... H04N 23/6812
348/E5.037
2016/0335778 A1* 11/2016 Smits ...................... H04N 23/56
2017/0352136 A1* 12/2017 Uliyar ........................ G06T 5/73
(Continued)

*Primary Examiner* — Richard T Torrente
(74) *Attorney, Agent, or Firm* — Polsinelli PC

(57) ABSTRACT

Tracking-based motion deblurring via coded exposure is provided. Fast object tracking is useful for a variety of applications in surveillance, autonomous vehicles, and remote sensing. In particular, there is a need to have these algorithms embedded on specialized hardware, such as field-programmable gate arrays (FPGAs) or application-specific integrated circuits (ASICs), to ensure energy-efficient operation while saving on latency, bandwidth, and memory access/storage. In an exemplary aspect, an object tracker is used to track motion of one or more objects in a scene captured by an image sensor. The object tracker is coupled with coded exposure of the image sensor, which modulates photodiodes in the image sensor with a known exposure function (e.g., based on the object tracking). This allows for motion blur to be encoded in a characteristic manner in image data captured by the image sensor. Then, in post-processing, deblurring is performed using a computational algorithm.

7 Claims, 7 Drawing Sheets

(56) References Cited

U.S. PATENT DOCUMENTS

2021/0117659 A1\* 4/2021 Foroozan ............... G06V 10/25
2021/0366479 A1\* 11/2021 Wexler .................... G10L 15/22

\* cited by examiner

| Folder | Video | Blurred (SURF Features #) | Blurred (SSIM) | Deblurred (SURF Features #) | Deblurred (SSIM) | Tracking (mAP) |
|---|---|---|---|---|---|---|
| ILSVRC2015_val_00023007 | Large speedboat | 45 | 0.8206 | 271 | 0.7597 | 0.9420 |
| ILSVRC2015_train_00177006 | Horse | 0 | 0.9657 | 0 | 0.9847 | 0.9514 |
| ILSVRC2015_val_00043017 | Bike stunt | 0 | 0.9349 | 7 | 0.9453 | 0.9615 |
| ILSVRC2015_train_00064403 | Race runway | 8 | 0.8918 | 45 | 0.8544 | 0.4823 |
| ILSVRC2015_val_00042019 | Red bike | 0 | 0.7387 | 4 | 0.6249 | 0.5000 |
| ILSVRC2015_train_00265801 | Mountain biker | 66 | 0.7792 | 19 | 0.1459 | 0.2500 |
| ILSVRC2015_val_00023009 | Speedboat distance | 0 | 0.9907 | 1 | 0.9920 | 0.8765 |
| ILSVRC2015_train_00259021 | Striped plane | 0 | 0.7140 | 27 | 0.9364 | 0.8039 |
| ILSVRC2015_train_00265805 | Bike with bird | 0 | 0.9933 | 0 | 0.9928 | 0.9899 |
| ILSVRC2015_val_00023001 | Speedboat coming closer | 2 | 0.5535 | 16 | 0.3924 | 0.5263 |
| ILSVRC2015_train_00092016 | Red sports car | 0 | 0.9181 | 4 | 0.9515 | 0.4242 |
| ILSVRC2015_val_00000000 | Turtle | 2 | 0.8663 | 2 | 0.9735 | 0.9050 |
| ILSVRC2015_val_00042016 | Red bike | 1 | 0.9637 | 16 | 0.9543 | 0.8463 |
| ILSVRC2015_train_00265030 | Mountain bike 2 | 1 | 0.9760 | 43 | 0.8806 | 0.8862 |
| ILSVRC2015_train_00259012 | Small plane flying | 0 | 0.9914 | 12 | 0.9866 | 0.9079 |
| ILSVRC2015_train_00259019 | Large plane | 0 | 0.9828 | 13 | 0.9781 | 0.7273 |
| ILSVRC2015_val_00007017 | Plane flying in sky | 0 | 0.0482 | 52 | 0.8868 | 0.9963 |
| ILSVRC2015_train_00005805 | Animal running | 0 | 0.9868 | 3 | 0.9916 | 0.5000 |
| ILSVRC2015_val_00042018 | Bike stunt | 0 | 0.9691 | 11 | 0.9533 | 0.9819 |
| ILSVRC2015_val_00005804 | Cow | 0 | 0.9215 | 13 | 0.9985 | 0.9997 |
| Average | | 6.25 | 0.8996 | 27.95 | 0.8643 | 0.7729 |

*FIG. 4*

TRACKING-BASED MOTION DEBLURRING VIA CODED EXPOSURE

RELATED APPLICATIONS

This application is a divisional application of non-provisional patent application Ser. No. 17/348,392 filed on Jun. 15, 2021, which claims the benefit of provisional patent application Ser. No. 63/039,224 filed on Jun. 15, 2020, and provisional patent application Ser. No. 63/041,260 filed on Jun. 19, 2020, the disclosures of which are hereby incorporated herein by reference in their entireties.

FIELD OF THE DISCLOSURE

The present disclosure relates to object tracking in optical imaging systems.

BACKGROUND

Object tracking is one of the most common applications for computer vision. In particular, it is utilized in surveillance, autonomous vehicles, robotics, and human-computer interaction. One main challenge for object tracking is the hardware limitations of tracking fast moving objects. Fast moving objects can induce motion blur at an image sensor due to long exposure times, which makes tracking difficult as blur can prevent accurate visual feature extraction. This is a particular problem for embedded imaging and vision platforms, where object tracking needs to be computationally lightweight and energy-efficient to preserve battery life while still being motion blur resistant.

The requirements of an optical system to track objects include the following: (1) high speed to image fast-moving objects, (2) low noise and no motion blur during exposure, and (3) energy-efficient and fast object detection algorithms to quickly make decisions in real-time. However, it is near impossible to realize these objectives simultaneously in an imaging system. For instance, low noise implies long exposure times, which prevents high speed tracking without motion blur. It is critical to co-design hardware and software to achieve these goals, as most bottlenecks in energy, latency, and throughput occur at the interface between sensor and processing units. Thus, a computational imaging system which overcomes traditional trade-offs (e.g., exposure vs. SNR, speed vs. motion blur) would be an ideal candidate for these objectives.

SUMMARY

Tracking-based motion deblurring via coded exposure is provided. Fast object tracking is useful for a variety of applications in surveillance, autonomous vehicles, and remote sensing. In particular, there is a need to have these algorithms embedded on specialized hardware, such as field-programmable gate arrays (FPGAs) or application-specific integrated circuits (ASICs), to ensure energy-efficient operation while saving on latency, bandwidth, and memory access/storage. However, one of the main challenges is accounting for motion blur that can occur due to sensor exposure times. Systems and methods are presented herein for performing tracking-based motion deblurring in a manner that is lightweight and resource utilization friendly.

In an exemplary aspect, an object tracker is used to track motion of one or more objects in a scene captured by an image sensor. The object tracker is coupled with coded exposure of the image sensor, which modulates photodiodes in the image sensor with a known exposure function (e.g., based on the object tracking). This allows for motion blur to be encoded in a characteristic manner in image data captured by the image sensor. Then, in post-processing, deblurring is performed using a computational algorithm. This approach can be further improved through hardware acceleration. For example, an FPGA implementation of tracking-based motion deblurring achieves 29 frames per second real-time performance with approximately 17 times speed-up in clock cycles as compared to software. Further embodiments use similar hardware-software optimization to improve computational imaging platforms.

An exemplary embodiment provides a method for tracking-based motion deblurring. The method includes receiving image data capturing a scene; tracking a blurred object in the scene; and performing coded exposure deblurring of the scene.

Another exemplary embodiment provides an imaging device. The imaging device includes an image sensor; and an image processor coupled to an optical sensor and configured to: receive image data capturing a scene from the image sensor; track a region of interest (ROI) corresponding to a blurred object in the image data; and cause the image sensor to perform coded exposure encoding based on the ROI.

Another exemplary embodiment provides an image processing system. The image processing system includes an image sensor; and a processor configured to accelerate tracking-based motion deblurring. The processor does so by receiving image data from the image sensor; tracking a blurred object in the image data; adapting encoding of the image sensor while capturing additional image data; and deblurring the blurred object in the additional image data.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a table presenting the results of quantitative experiments on a dataset.

DETAILED DESCRIPTION

Figure 1A:
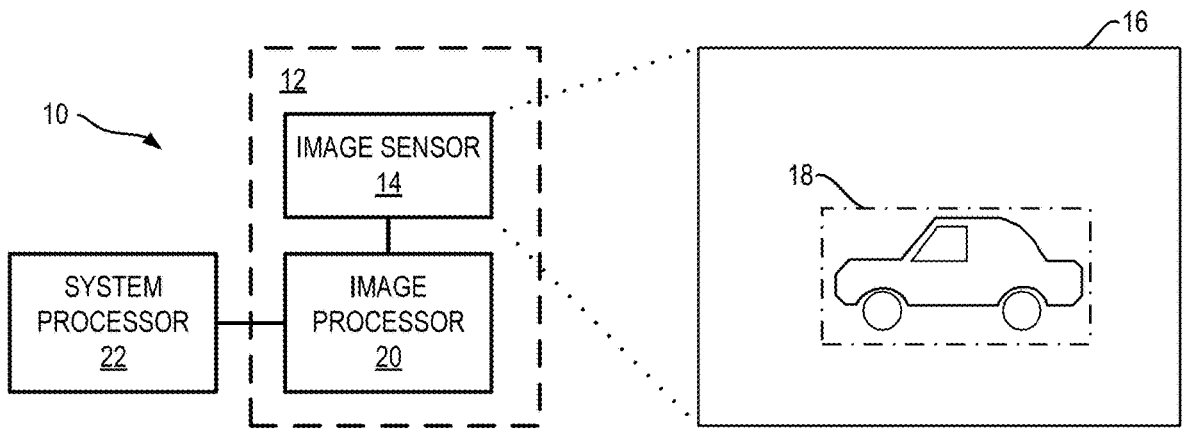
FIG. 1A is a schematic block diagram of an image processing system which can implement tracking-based motion deblurring according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Tracking-based motion deblurring via coded exposure is provided. Fast object tracking is useful for a variety of applications in surveillance, autonomous vehicles, and remote sensing. In particular, there is a need to have these algorithms embedded on specialized hardware, such as field-programmable gate arrays (FPGAs) or application-specific integrated circuits (ASICs), to ensure energy-efficient operation while saving on latency, bandwidth, and memory access/storage. However, one of the main challenges is accounting for motion blur that can occur due to sensor exposure times. Systems and methods are presented herein for performing tracking-based motion deblurring in a manner that is lightweight and resource utilization friendly.

In an exemplary aspect, an object tracker is used to track motion of one or more objects in a scene captured by an image sensor. The object tracker is coupled with coded exposure of the image sensor, which modulates photodiodes in the image sensor with a known exposure function (e.g., based on the object tracking). This allows for motion blur to be encoded in a characteristic manner in image data captured by the image sensor. Then, in post-processing, deblurring is performed using a computational algorithm. This approach can be further improved through hardware acceleration. For example, an FPGA implementation of tracking-based motion deblurring achieves 29 frames per second real-time performance with approximately 17 times speed-up in clock cycles as compared to software. Further embodiments use similar hardware-software optimization to improve computational imaging platforms.

I. Introduction

The present disclosure explores the potential for tracking-based motion deblurring on-board an embedded imaging platform. A simple process is proposed to perform this task by combining a mean shift tracking algorithm and coded exposure of the image sensor, as described further in Section II. This tracking-based motion deblurring process can be accelerated on hardware (e.g., using off-the shelf or customized hardware acceleration), such as in an FPGA implementation as described in Section III.

The tracking-based motion deblurring process is validated in software simulations on a small video dataset in Section IV-C. Simulation results show that coded exposure deblurring leads to better object tracking performance in general. The tracking-based motion deblurring process is further implemented on a Xilinx Zynq FPGA to measure the performance on real hardware in Section IV-D. The process achieves a mean average precision (mAP) of 0.7729 with about 27 feature matches with the input image on average. The process achieves a frame rate of 29 frames per second real-time performance in hardware and 6 frames per second in software.

A computer system for implementing an image processing system and the tracking-based motion deblurring process is described in Section V. As discussed further in Section VI, the area of embedded computational imaging is an emerging field where embedded systems and image sensors are jointly optimized for image and video processing. Embodiments described herein have tremendous potential for several applications such as autonomous driving, drones, and robotic platforms.

II. Tracking-Based Motion Deblurring

FIG. 1A is a schematic block diagram of an image processing system 10 which can implement tracking-based motion deblurring according to embodiments described herein. The image processing system 10 includes image sensor hardware 12 having an image sensor 14 (e.g., an optical image sensor, an infrared image sensor, a radar image sensor, etc.) which captures image data of a scene 16. The scene includes a region of interest (ROI) 18, which can include or represent a blurred object.

The image sensor hardware 12 (e.g., an imaging device) further includes an image processor 20 coupled to the image sensor 14 and configured to receive the image data capturing the scene 16, as well as to control operation of the image sensor 14. In some embodiments, the image processor 20 is an embedded or on-chip logic device, such as a microcontroller, FPGA, a digital signal processor (DSP), ASIC, or other programmable logic device. The image processing system 10 can further include a system processor 22 (e.g., a central processing unit (CPU) or other general processing logic), which may provide further processing of the image data and/or control of the image sensor hardware 12.

The image processing system 10 implements the tracking-based motion deblurring process described herein. In this regard, one or both of the image processor 20 and the system processor 22 can implement an object tracker to track motion of one or more objects (e.g., a blurred object in the ROI 18) in the scene 16 captured by the image sensor 14. The image processor 20 generally couples the object tracker with coded exposure of the image sensor 14 by modulating sensor elements (e.g., photodiodes) in the image sensor 14 with a known exposure function (e.g., by applying the known exposure function to sensor elements capturing the ROI 18 as it is tracked across frames of the image data).

The tracking-based motion deblurring process described herein includes two main components: (1) use of object tracking to identify the blurred object (e.g., the ROI 18) present in the scene 16, and (2) coded exposure deblurring given that tracked object. Each of these algorithms is discussed in more detail, along with a flow diagram of the tracking-based motion deblurring process and a simulation pipeline used to evaluate an exemplary embodiment. Section IV shows experimental results in both hardware and software.

A. Object Tracking

In some embodiments, mean shift tracking is used for single object tracking since it is light weight and easy to implement on hardware, while still delivering satisfactory performance in tracking. This is important since motion deblurring is the most expensive part of the pipeline as described further below. Thus, some embodiments allocate most computational resources of the image processor 20 and/or the system processor 22 to motion deblurring. It should be understood that other object tracking approaches may be used, including to track multiple objects in the scene 16.

The mean shift tracking algorithm estimates how color histogram values of the ROI 18 move as a cluster over time in the image using non-parametric methods. In some embodiments, an object detector is implemented for a first iteration to select an initial ROI 18 (e.g., identifying a blurred object) for the mean shift tracking algorithm. However, once the mean shift tracking algorithm receives an initial bounding box it computes the color histogram for every frame and uses that to find a centroid of the ROI 18.

B. Coded Exposure

Coded exposure is a hardware-software co-design technique to help improve the ability of deblurring processes for motion blur. Coded exposure modulates sensor elements (e.g., photodiodes) in the image sensor 14 with a known exposure function, which allows for motion blur to be encoded in a characteristic manner in a produced image. Then, in post-processing, deblurring can occur using a computational algorithm. In this manner, coded exposure techniques break the trade-off between exposure time, motion blur, and signal-to-noise ratio.

Coded exposure was first introduced using a ferroelectric mechanical shutter in front of a camera to perform optical shuttering. The encoded blurred image could then be deblurred using a matrix inversion since the modulation function is known a priori. This idea has been extended to video and built into the electronic readout of complementary metal-oxide-semiconductor (CMOS) image sensors for improved performance.

Accordingly, coded exposure consists of modulating the pixel response from an image sensor 14 such that motion blur is encoded in a characteristic fashion so that it can be easily inverted/deblurred in post-processing. Formally, m(t) is defined to be a random sequence corresponding to this exposure that the sensor performs. An image I is formed by the following equation:

$$I = \int_t S(t) \cdot m(t) dt \qquad \text{Equation 1}$$

where S(t) is the scene radiance during the exposure time of the camera.

This leads to the discretized equation y=Ax where x is the vectorized scene radiance (not blurred), A is a matrix corresponding to the exposure, and y is the blurred image captured by the image sensor 14. Note that the matrix A is formed using the vector m(t) and the size of the blurred image. Given the fact that the coded exposure technique works well for linear motion, matrix A is constructed such that is has the same number of columns as the rows of the blurred region of the image.

Each element of the modulation function is normalized with respect to the total sum of all the elements present in the sequence. The normalized sequence is then padded with zeros. The number of zeros added is equal to the row of the blurred region (e.g., the ROI 18) minus 1. Having obtained the zero padded vector, a sparse circulant matrix is created, the rows of which are shifted versions of the zero padded sequence. After this, a column vector b k is created in order to simulate the effect of the blur having smeared onto the background pixels. Conjoining the circulant matrix with this b k vector leaves the final convolutional matrix A.

To perform deblurring, the following optimization problem is solved:

$$\arg\min_x \|y - Ax\|_2^2 + \|x\|_2^2 \qquad \text{Equation 2}$$

This optimization problem can be rewritten as a single matrix inversion, solving $x = A^\dagger y$ where $A^\dagger$ is the pseudoinverse of the matrix A. Note that if A has full rank and is not underdetermined, then $A^\dagger = A^{-1}$. However, this is not always the case as far as real-life point spread functions are concerned. As such, a pseudo-inverse of the blur kernel is taken for computing the deconvolved image. For illustrative purposes, the Moore-Penrose pseudo-inverse of matrix A is taken and computed using singular value decomposition (SVD).

C. Process for Tracking-Based Motion Deblurring

Figure 1B:
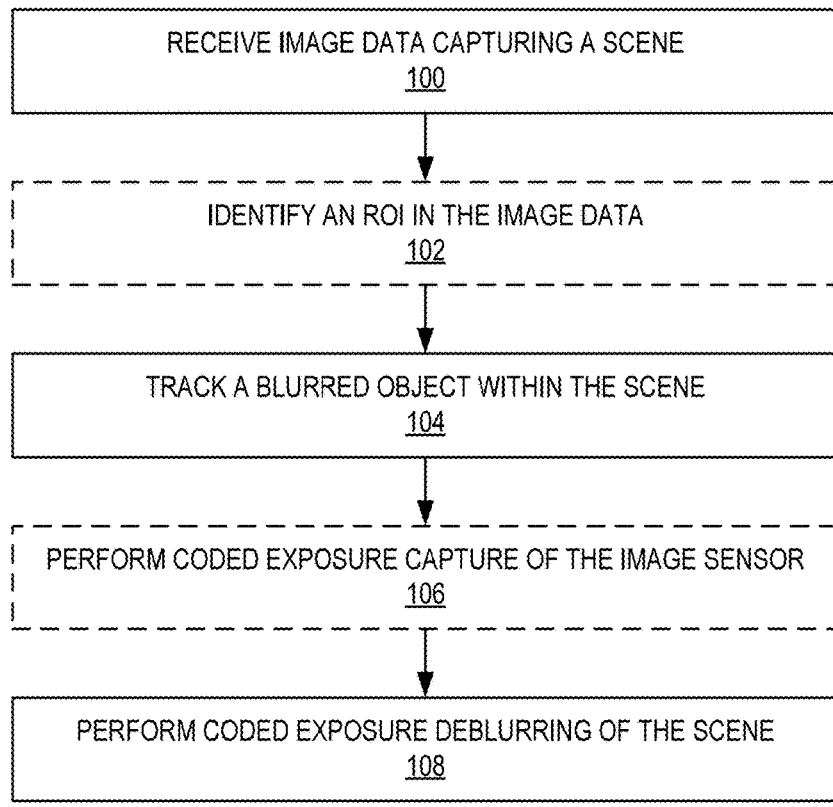
FIG. 1B is a flow diagram illustrating a process for tracking-based motion deblurring.

FIG. 1B is a flow diagram illustrating a process for tracking-based motion deblurring. Dashed boxes represent optional steps. The process begins at operation 100, with receiving image data capturing a scene 16. In an exemplary aspect, the image data is received by the image processor 20 from the image sensor 14 of FIG. 1A. The process optionally continues at operation 102, with identifying an ROI 18 in the image data. The ROI 18 may be identified using an object detector, and the ROI 18 may further include a blurred object within the image data. The process continues at operation 104, with tracking the blurred object in the scene (e.g., by tracking the ROI over multiple image frames). In an exemplary aspect, a tracking algorithm, such as mean shift tracking, is used to track one or more blurred objects in the scene. The tracking algorithm may be implemented on the image sensor hardware 12 as image data continues to be captured.

The process optionally continues at operation 106, with performing coded exposure of the image sensor 14. Performing coded exposure includes modulating the pixel response of the image sensor (e.g., within the ROI 18) such that motion blur is encoded in a characteristic fashion so that it can be readily inverted/deblurred in post-processing. The process continues at operation 108, with performing coded exposure deblurring of the scene 16. The coded exposure deblurring can be performed in post processing (e.g., at the system processor 22) using a computational algorithm, which can be a machine learning algorithm.

Although the operations of FIG. 1B are illustrated in a series, this is for illustrative purposes and the operations are not necessarily order dependent. Some operations may be performed in a different order than that presented. Further, processes within the scope of this disclosure may include fewer or more steps than those illustrated in FIG. 1B.

D. Simulation Pipeline

Figure 2:
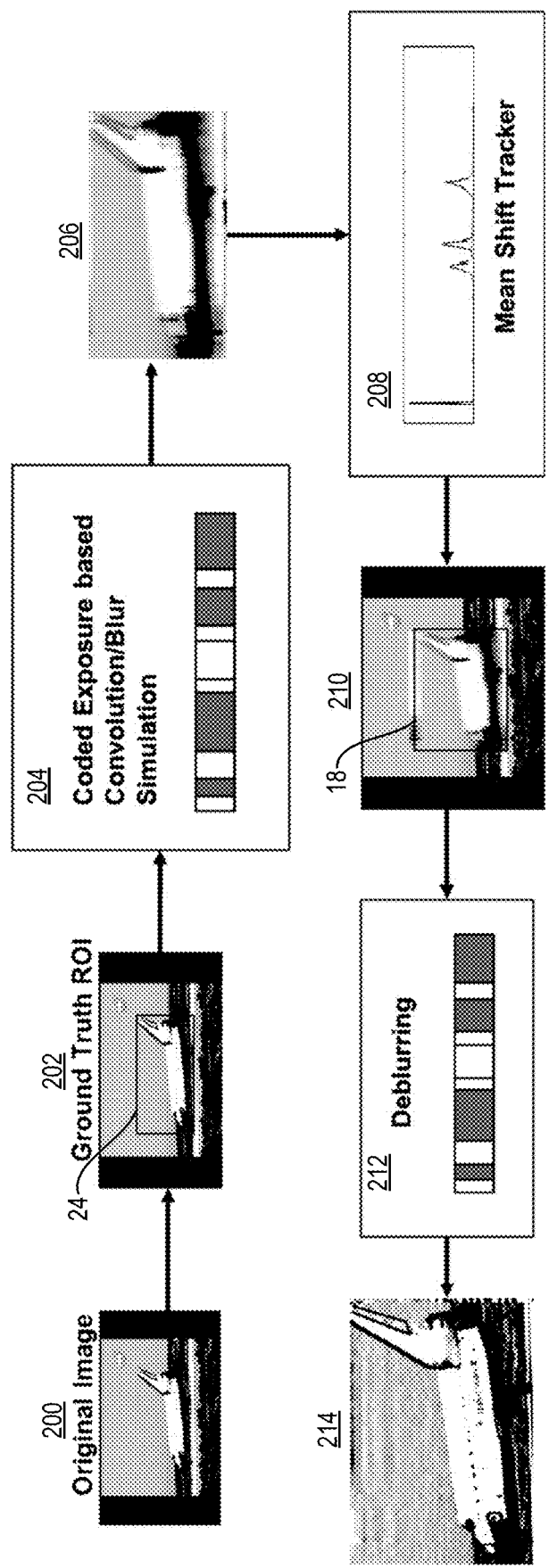
FIG. 2 is a flow diagram of a simulation pipeline used for evaluation of an exemplary embodiment of the tracking-based motion deblurring process.

FIG. 2 is a flow diagram of a simulation pipeline used for evaluation of an exemplary embodiment of the tracking-based motion deblurring process. Simulated motion blurring is performed along the top of the diagram (blocks 200, 202, 204, 206), and the tracking-based motion deblurring process is performed along the bottom of the diagram (blocks 208, 210, 212, 214). In this regard, an original image is received (block 200) and a ground truth ROI 24 is identified for simulated blurring (block 202). A coded exposure-based convolution/blur simulation is performed to simulate motion blurring (block 204) in the ground truth ROI 24 to produce a blurred image (block 206).

The tracking-based motion deblurring process begins with object tracking using the mean shift tracker (block 208), as described further above. This results in identification (and tracking) of an ROI 18 for the blurred object (e.g., corresponding to the ground truth ROI 24 used to simulate blurring) (block 210). Coded exposure deblurring of the blurred image is performed (e.g., at the ROI 18) (block 212), which results in a deblurred image (block 214).

III. FPGA Implementation

FPGAs are used as example hardware platforms for the present disclosure because of their reprogrammability, low latency, high bandwidth, and on-board memory for hardware acceleration. In addition to this, one particular application of interest for object tracking and motion deblurring is identifying targets for space debris tracking. Over the past half century, there has been a steady increase in the number of objects and amount of debris that has been present in the Earth's orbit. This poses a major risk for collision in low Earth orbits for active satellites and manned space missions.

An optical system to track space debris and flying projectiles requires radiation-hardened electronics to be deployed on space-based platforms. Radiation-hardened FPGAs are a growing market for space-bound applications where flexibility and dataflow-intensive processing is desired, and thus are the hardware platform of choice. While ASICs could also be a viable solution, they are difficult to program and are not as flexible to use. In addition, there are not many user-friendly high-level synthesis tool-flows for ASICs to accelerate embedded computer vision algorithms.

Figure 3A:
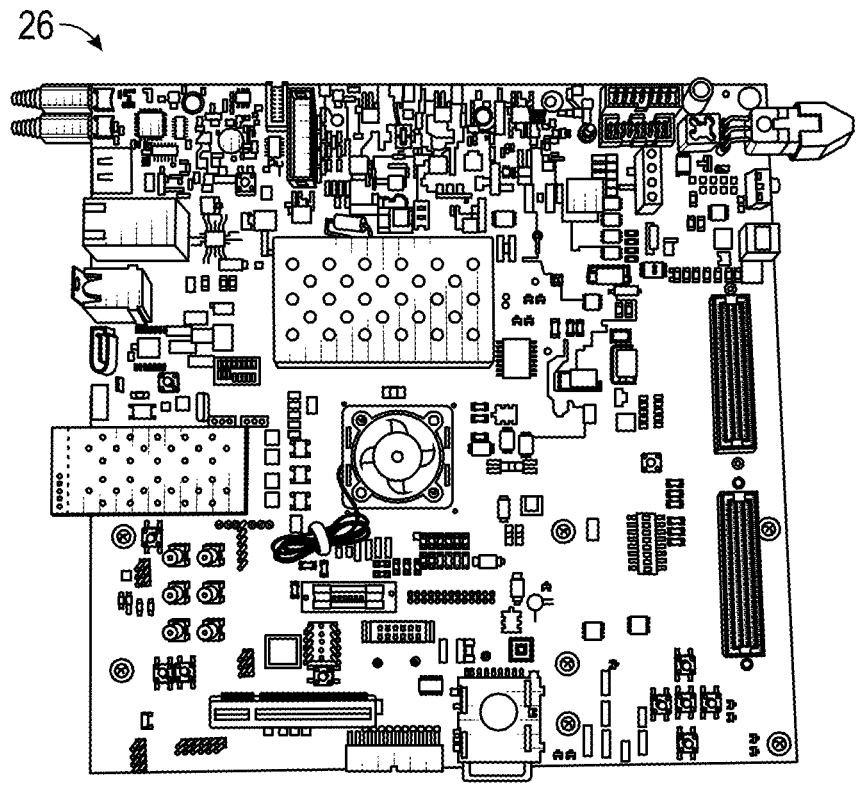
FIG. 3A is a picture of an exemplary field-programmable gate array (FPGA) used for evaluating performance of the tracking-based motion deblurring process on hardware.

FIG. 3A is a picture of an exemplary FPGA 26 used for evaluating performance of the tracking-based motion deblurring process on hardware. To accelerate the tracking-based motion deblurring process, Xilinx's Zynq Ultrascale+ MPSoC ZCU102 board is used. The software-defined system-on-chip (SDSoC) platform toolkit is used to program the board. This SDSoC environment is a full-system C/C++ optimized compiler which automatically accelerates software in programmable logic along with system connectivity generation.

The tracking-based motion deblurring process of FIG. 2 is implemented in C++ code, which is then auto-generated to Verilog code using the SDSoC's synthesis feature. Verilog code generation, placing, routing and bitstream generation are all performed via the SDSoC environment. To communicate input and output data (such as images) with the FPGA 26, the SD card boot mode and an SD card are used to load the program and input videos onto the board. A laptop with a Core i7 processor is used for synthesizing the proposed tracking-based motion deblurring process. The synthesis took approximately 4 hours to complete.

Figure 3B:
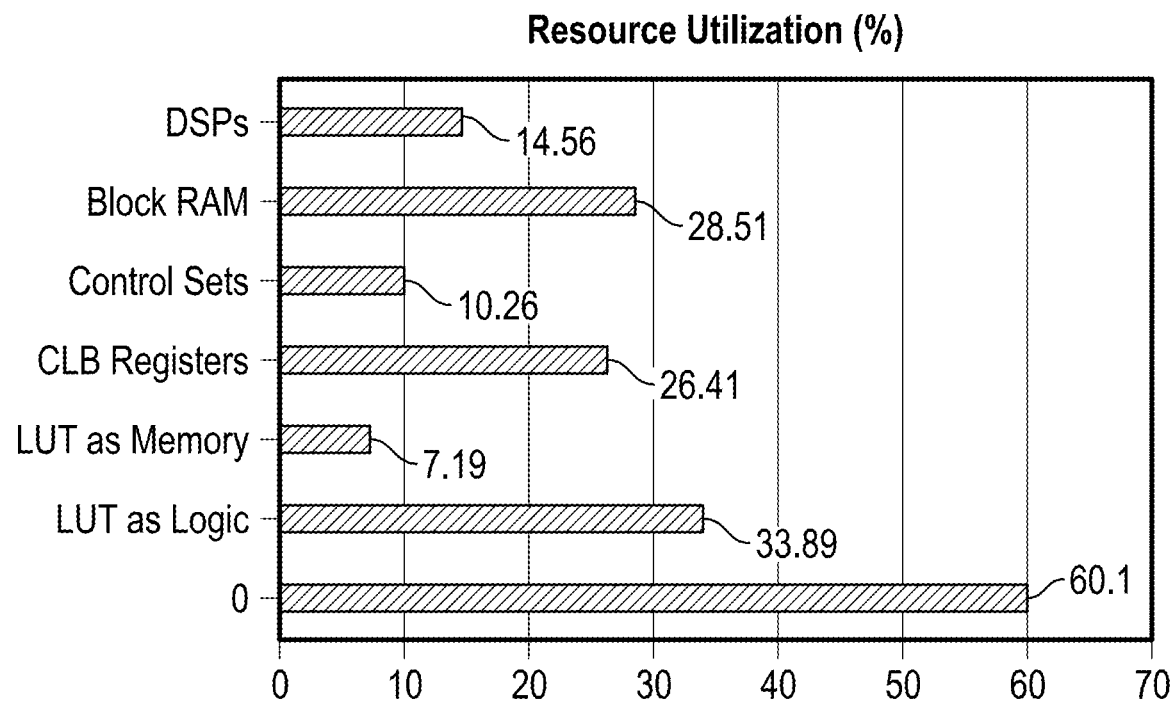
FIG. 3B is a graphical representation of resource utilization of the FPGA of FIG. 3A configured for accelerating the tracking-based motion deblurring process of FIG. 2.

FIG. 3B is a graphical representation of resource utilization of the FPGA 26 of FIG. 3A configured for accelerating the tracking-based motion deblurring process of FIG. 2.

IV. Results

A. Dataset

Since there is no dataset available for coded exposure videos from an actual camera, simulated coded exposure blur is performed using the matrix A constructed in Section II (e.g., as described with respect to FIG. 2). Twenty single object videos from the ILSVRC2015 dataset (described in O. Russakovsky, J. Deng, H. Su, J. Krause, S. Satheesh, S. Ma, Z. Huang, A. Karpathy, A. Khosla, M. Bernstein, A. C. Berg, and L. Fei-Fei, "ImageNet Large Scale Visual Recognition Challenge," International Journal of Computer Vision (IJCV), vol. 115, no. 3, pp. 211-252, 2015) are used, with coded exposure blur performed followed by deblurring via Equation 2.

One of the major limitations of the coded exposure-based deblurring technique is that it requires a priori blur location information. This problem is addressed by using the mean shift tracker to automatically identify regions of interest prior to performing deconvolution. The subset of videos sampled from the dataset include simple cases like a plane flying (with just the sky as the background), as well as difficult cases like people performing stunts on bikes.

B. Metrics

The mAP and intersection over union (IoU) are used to quantify how well the mean shift tracking algorithm performs in the event of blur. The IoU is an indicator of how much overlap there is between the true bounding box or ROI and the algorithm generated bounding box. It is computed by dividing the intersection of the two ROIs by the union of the two ROIs. The denominator penalizes the instances where the algorithm generated bounding box zeros in on a very small portion of the object of interest. In this study, the IoU for each frame of a video is measured and the number of frames is counted for which the IoU is higher than or equal to 0.5. The mAP is obtained by taking the ratio of this number with the total number of frames.

In order to evaluate the deblurring capabilities of the tracking-based motion deblurring process, two full reference image quality assessment metrics are used. The first is the speeded-up robust features (SURF)-based feature matching (described in H. Bay, T. Tuytelaars, and L. Van Gool, "Surf: Speeded up robust features," in European conference on computer vision. Springer, 2006, pp. 404-417) and the second is the structural similarity index (SSIM) (described in Z. Wang, A. C. Bovik, H. R. Sheikh, and E. P. Simoncelli, "Image quality assessment: from error visibility to structural similarity," IEEE transactions on image processing, vol. 13, no. 4, pp. 600-612, 2004).

SURF feature matching relies on wavelet responses of the reference image and the second image. The technique also involves the sign of the Laplacian which helps in finding the underlying points of interest in an image. The total number of SURF feature matches found with the original input image is computed for both the blurred as well as the final deblurred images. SSIM is a measure of how similar two images are and its values fall in the range of −1 to 1.

C. Software Results

FIG. 4 is a table presenting the results of the quantitative experiments on the dataset. Note that the tracking-based motion deblurring process achieves a tracking performance of 0.7729 mAP on coded exposure-based blurred video frames, which is higher than other types of regular motion blur. This is suspected to be due to the high frequencies preserved by coded exposure, thus allowing for tracking to still be somewhat effective. After tracking, deblurring is performed using the process described in Section II. As one can see in the table, SSIM is not a great measure for deblurring performance, with the value actually slightly decreasing on average as compared to blurred videos. However, the number of SURF features per frame increased from 6.29 to 27.95 on average, indicating the usefulness of coded exposure deblurring for visual feature extraction.

Figure 5:
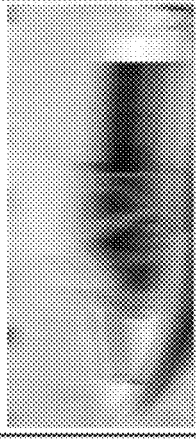
FIG. 5 illustrates visual results of an embodiment of the tracking-based motion deblurring process of FIG. 2 for an easy and hard video sequence.

FIG. 5 illustrates visual results of an embodiment of the tracking-based motion deblurring process of FIG. 2 for an easy and hard video sequence. Further, this is confirmed to be the case by qualitatively looking at the results for the 20 videos. In FIG. 5, one can see the results of the blurred coded exposure images as well as the deblurred outputs. Examples of both easy and hard cases show where the limitations of the tracking-based motion deblurring process lie.

Having investigated both metrics, some insight is gained as to how the metrics were being affected by underlying video information. In most of the videos, the SSIM values obtained for blurred and deblurred images were approximately the same. From this, the following two conclusions are drawn: first, SSIM is not a good metric for determining the effectiveness of deblurring via coded exposure and second, SSIM reveals the ability of the coded exposure technique to preserve high frequency information. Simulating blur in software using a pseudorandom sequence preserved the retention of high frequency information. Thus, the computed SSIMs for the blurred images turned out to be surprisingly high. On the other hand, SURF feature matching is an effective metric for coded exposure deblurring. The feature matching results were in agreement with visual inspection of most of the videos.

D. Hardware Results

Latency in clock cycles and resource utilization are used as metrics for evaluation of the tracking-based motion deblurring process in hardware. Two variations of the tracking-based motion deblurring process are implemented even though the underlying concept for both variations is the same.

First, Cholesky decomposition is employed to perform the matrix inversion operation. The matrix inversion step is the most computationally expensive operation of the whole process. Cholesky decomposition turned out to be too compute-intensive, even for an FPGA. This technique resulted in a speed of approximately 2 frames per second (FPS). This version of the tracking-based motion deblurring process is referred to as Variation 1.

Second, to further speed up the process in hardware, a roundabout way of achieving the same quality results with lower latency was devised. To this end, it is proposed that all possible blur kernels should be hard-coded, and the output of the mean shift algorithm should trigger the appropriate kernel. The nature of the coded exposure algorithm allows this, since the formation of the blur kernel A depends solely on the coded sequence (which is always going to remain constant) and the size of the blurred-out region.

To test the effectiveness of this variation of the tracking-based motion deblurring process, this technique was tested using a video where the size of the blurred region is 26×22. The resolution of the full image is 640×380. Mean shift is run on the input image, successfully outputting the ROI. The ROI is cropped out of the full frame, then the size of the blurred region is checked. The blur kernel corresponding to that particular size of the image is activated and it undergoes matrix multiplication with the input blurry image. The final output of this operation is the deblurred image. This technique essentially solves $x=A^{-1}y$ in hardware. This version of the tracking-based motion deblurring process is referred to as Variation 2.

Figure 6:
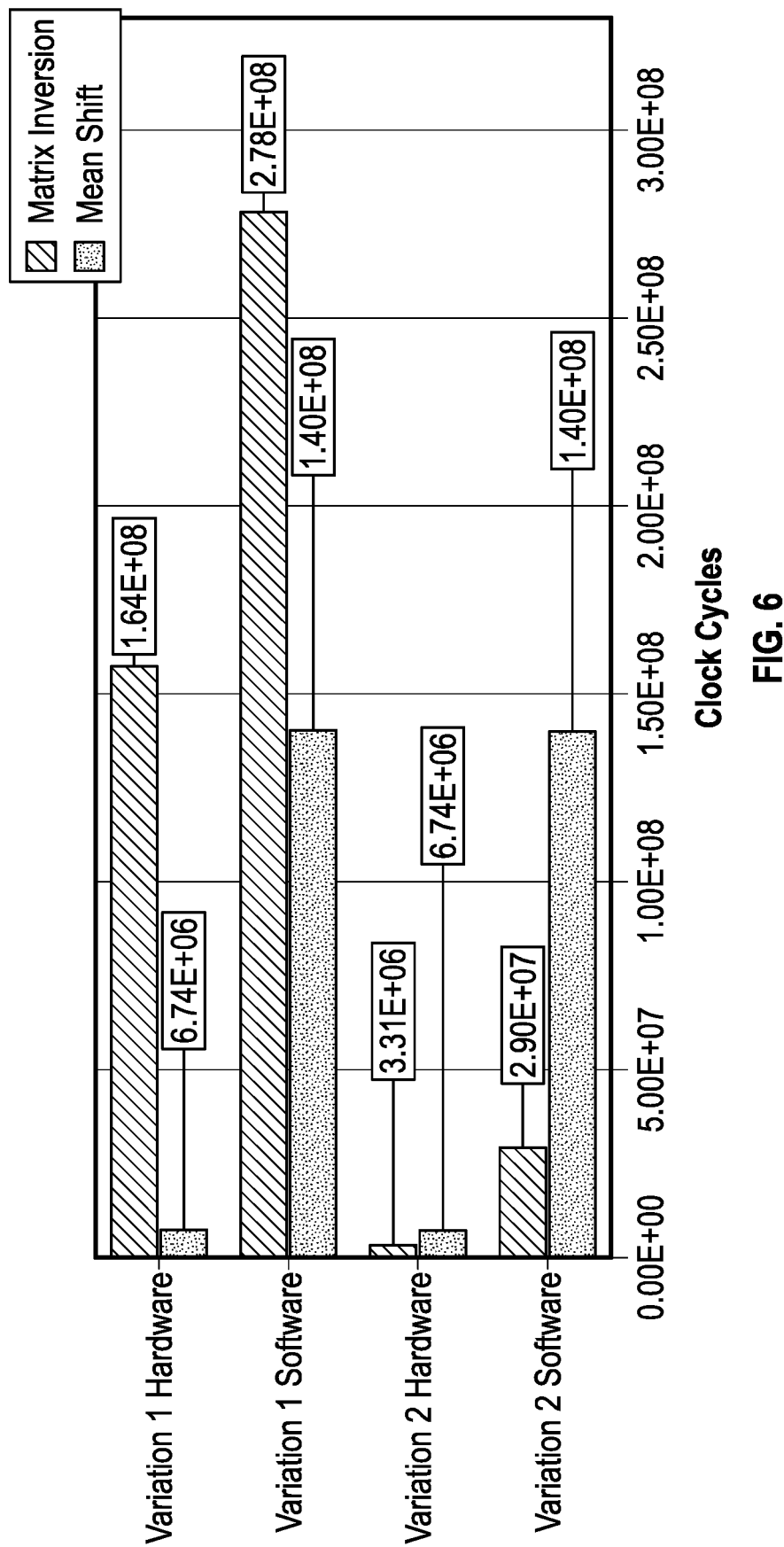
FIG. 6 is a graphical representation of latency results in terms of clock cycles for hardware and software implementations of the tracking-based motion deblurring process of FIG. 2.

FIG. 6 is a graphical representation of latency results in terms of clock cycles for hardware and software implementations of the tracking-based motion deblurring process of FIG. 2. The results obtained for Variations 1 and 2 in both hardware and software are presented. With an FPGA speed of 300 MHz, the effective FPS of Variation 2 in hardware turns out to be approximately 29.

V. Computer System

Figure 7:
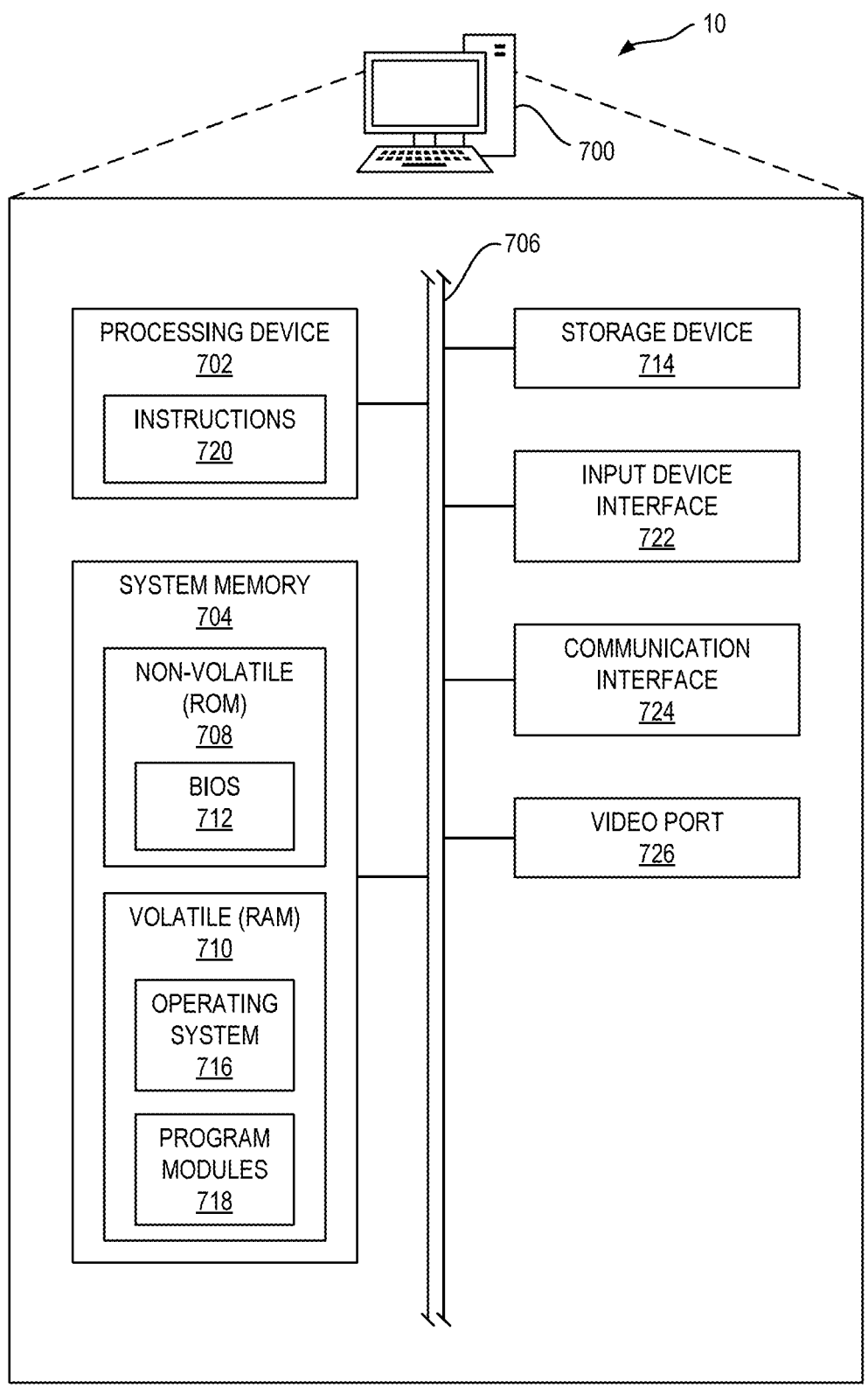
FIG. 7 is a block diagram of the image processing system suitable for implementing tracking-based motion deblurring via coded exposure according to embodiments disclosed herein.

FIG. 7 is a block diagram of the image processing system 10 suitable for implementing tracking-based motion deblurring via coded exposure according to embodiments disclosed herein. The image processing system 10 includes or is implemented as a computer system 700, which comprises any computing or electronic device capable of including firmware, hardware, and/or executing software instructions that could be used to perform any of the methods or functions described above. In this regard, the computer system 700 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 700 in this embodiment includes a processing device 702 or processor, a system memory 704, and a system bus 706. The system memory 704 may include non-volatile memory 708 and volatile memory 710. The non-volatile memory 708 may include read-only memory (ROM), erasable programmable read-only memory (EPROM), electrically erasable programmable read-only memory (EEPROM), and the like. The volatile memory 710 generally includes random-access memory (RAM) (e.g., dynamic random-access memory (DRAM), such as synchronous DRAM (SDRAM)). A basic input/output system (BIOS) 712 may be stored in the non-volatile memory 708 and can include the basic routines that help to transfer information between elements within the computer system 700.

The system bus 706 provides an interface for system components including, but not limited to, the system memory 704 and the processing device 702. The system bus 706 may be any of several types of bus structures that may further interconnect to a memory bus (with or without a memory controller), a peripheral bus, and/or a local bus using any of a variety of commercially available bus architectures.

The processing device 702 represents one or more commercially available or proprietary general-purpose processing devices, such as a microprocessor, CPU, or the like. The processing device 702 can further represent one or more of the image processor 20 and the system processor 22 of FIG. 1A. More particularly, the processing device 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 702 is configured to execute processing logic instructions for performing the operations and steps discussed herein.

In this regard, the various illustrative logical blocks, modules, and circuits described in connection with the embodiments disclosed herein may be implemented or performed with the processing device 702, which may be a microprocessor, FPGA, a DSP, an ASIC, or other programmable logic device, a discrete gate or transistor logic, discrete hardware components, or any combination thereof designed to perform the functions described herein. Furthermore, the processing device 702 may be a microprocessor, or may be any conventional processor, controller, microcontroller, or state machine. The processing device 702 may also be implemented as a combination of computing devices (e.g., a combination of a DSP and a microprocessor, a plurality of microprocessors, one or more microprocessors in conjunction with a DSP core, or any other such configuration).

The computer system 700 may further include or be coupled to a non-transitory computer-readable storage medium, such as a storage device 714, which may represent an internal or external hard disk drive (HDD), flash memory, or the like. The storage device 714 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 716 and any number of program modules 718 or other applications can be stored in the volatile memory 710, wherein the program modules 718 represent a wide array of computer-executable instructions corresponding to programs, applications, functions, and the like that may implement the functionality described herein in whole or in part, such as through instructions 720 on the processing device 702. The program modules 718 may also reside on the storage mechanism provided by the storage device 714. As such, all or a portion of the functionality described herein may be implemented as a computer program product stored on a transitory or non-transitory computer-usable or computer-readable storage medium, such as the storage device 714, volatile memory 710, non-volatile memory 708, instructions 720, and the like. The computer program product includes complex programming instructions, such as complex computer-readable program code, to cause the processing device 702 to carry out the steps necessary to implement the functions described herein.

An operator, such as the user, may also be able to enter one or more configuration commands to the computer system 700 through a keyboard, a pointing device such as a mouse, or a touch-sensitive surface, such as the display device, via an input device interface 722 or remotely through a web interface, terminal program, or the like via a communication interface 724. The communication interface 724 may be wired or wireless and facilitate communications with any number of devices via a communications network in a direct or indirect fashion. An output device, such as a display device, can be coupled to the system bus 706 and driven by a video port 726. Additional inputs and outputs to the computer system 700 may be provided through the system bus 706 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

VI. Discussion

In this disclosure, a coded exposure-based deblurring algorithm coupled with an object tracker is implemented on an FPGA. Besides showing feasibility of the tracking-based motion deblurring process 12 in simulation, its effectiveness is quantified using two different image quality assessment tools: the SSIM and the SURF feature matching. SSIM proved to be an ineffective tool for capturing the deblurring quality achieved by the tracking-based motion deblurring process 12, mainly because of the inherent strength of the coded exposure technique in preserving high frequency information.

However, the SURF feature matching agreed with visual inspection of the deblurred videos. This yields new insight into SURF feature matching as a suitable metric for evaluating coded exposure algorithms. Further, it is observed that coded exposure assists in tracking blurred objects by retaining high frequency information, achieving a mAP of 0.7729 on sample videos.

In terms of hardware efficiency, FPGA acceleration resulted in a speed-up of about 17× in clock cycles compared to software. This improvement in latency was achieved by pre-computing the blur kernels as compared to a Cholesky decomposition, achieving a real-time performance of 29 FPS. Some embodiments fully exploit the on-board DDR memory for gaining higher bandwidth and faster performance. Additional embodiments implement a neural network-based object tracker to further improve the tracking mAP.

Those skilled in the art will recognize improvements and modifications to the preferred embodiments of the present disclosure. All such improvements and modifications are considered within the scope of the concepts disclosed herein and the claims that follow.

What is claimed is:

1. An imaging device, comprising:
   an image sensor; and
   an image processor coupled to an optical sensor and configured to:
   receive image data capturing a scene from the image sensor;
   track a region of interest (ROI) corresponding to a blurred object across multiple frames in the image data;
   perform coded exposure deblurring of the scene, to:
   modulate one or more photodiodes of the image sensor based on the tracked ROI across the multiple frames of the image data; and
   encode motion blur associated with the ROI in the scene from the image data captured by the image sensor as the ROI is tracked across the multiple frames of the image data,
   wherein deblurring of the ROI in the scene is performed subsequent to the tracking and identification of the ROI, and
   wherein mean shift tracking is employed to track the ROI to locate the ROI in each frame.

2. The imaging device of claim 1, wherein the image processor is further configured to track the ROI by implementing a tracking algorithm.

3. The imaging device of claim 2, wherein mean shift tracking includes estimation of how color histogram values of the ROI move as a cluster over time in the image data using non-parametric methods, wherein an object detector selects the ROI for the mean shift tracking, and, after receiving an initial bounding box, a color histogram is computed for each frame and the color histogram is used to find a centroid of the ROI.

4. The imaging device of claim 1, wherein the image processor is further configured to deblur the scene based on the coded exposure of the image sensor.

5. The imaging device of claim 1, wherein the image processor is an embedded image processor.

6. The imaging device of claim 5, wherein the image processor comprises a field-programmable gate array (FPGA).

7. The imaging device of claim 5, wherein the image processor comprises an application-specific integrated circuit (ASIC).

* * * * *